United States Patent [19]

Sann et al.

[11] Patent Number: 5,560,824
[45] Date of Patent: Oct. 1, 1996

[54] FILTER DEVICE WITH CLOSING ARRANGEMENT AND KEY OPENING CONNECTION

[75] Inventors: Norbert Sann; Jurgen Hausdorf, both of Saarbrucken, Germany

[73] Assignee: Hydac Filtertechnik GmbH, Sulzbach/Saar, Germany

[21] Appl. No.: 525,609

[22] PCT Filed: Dec. 2, 1993

[86] PCT No.: PCT/EP93/03394

§ 371 Date: Sep. 21, 1995

§ 102(e) Date: Sep. 21, 1995

[87] PCT Pub. No.: WO94/22548

PCT Pub. Date: Oct. 13, 1994

[30] Foreign Application Priority Data

Mar. 31, 1993 [DE] Germany ............. 43 10 492.4

[51] Int. Cl.6 .................... B01D 35/153; B01D 27/10
[52] U.S. Cl. ............. 210/234; 210/235; 210/136; 210/444; 210/450; 251/128; 251/291
[58] Field of Search ................... 210/234, 235, 210/136, 444, 450; 251/128, 291

[56] References Cited

U.S. PATENT DOCUMENTS

| | | |
|---|---|---|
| 1,840,883 | 1/1932 | Brecher . |
| 2,005,445 | 6/1935 | Wiedhofft . |
| 2,955,712 | 10/1960 | Gutkowski . |
| 2,991,885 | 7/1961 | Gutkowski . |
| 3,167,507 | 1/1965 | Burhans et al. ............ 210/117 |
| 3,399,776 | 9/1968 | Kruth . |
| 4,559,136 | 12/1985 | Dockery . |
| 4,588,504 | 5/1986 | Berges . |
| 4,832,077 | 5/1989 | Pilolla . |
| 5,350,506 | 9/1994 | Dombek . |

FOREIGN PATENT DOCUMENTS

| | | |
|---|---|---|
| 0322828A1 | 7/1989 | European Pat. Off. . |
| 0492627A2 | 7/1992 | European Pat. Off. . |
| 2623409B2 | 5/1976 | Germany . |
| 3031431A1 | 8/1980 | Germany . |
| 1566502 | 4/1980 | United Kingdom . |
| 94/22548 | 10/1994 | WIPO . |

*Primary Examiner*—Thomas M. Lithgow
*Attorney, Agent, or Firm*—Roylance, Abrams, Berdo & Goodman, L.L.P.

[57] ABSTRACT

A filter device has a housing with connections for a fluid and can be secured to a filter pot. The filter has a filter element secured by a holder. A closure prevents the undesired leakage of fluid. The closure has two sealing plates with at least partly bound openings in mutually staggered array in two different planes. The openings can be mutually moved under the effect of a power store for closing or opening the openings. As the filter pot is moved further away from the housing, the closure gradually seals at least one of the connections and/or the filter pot off from the environment. The filter device has a universally usable closure which can be economically produced, requires little space inside the device and operates reliable.

11 Claims, 6 Drawing Sheets

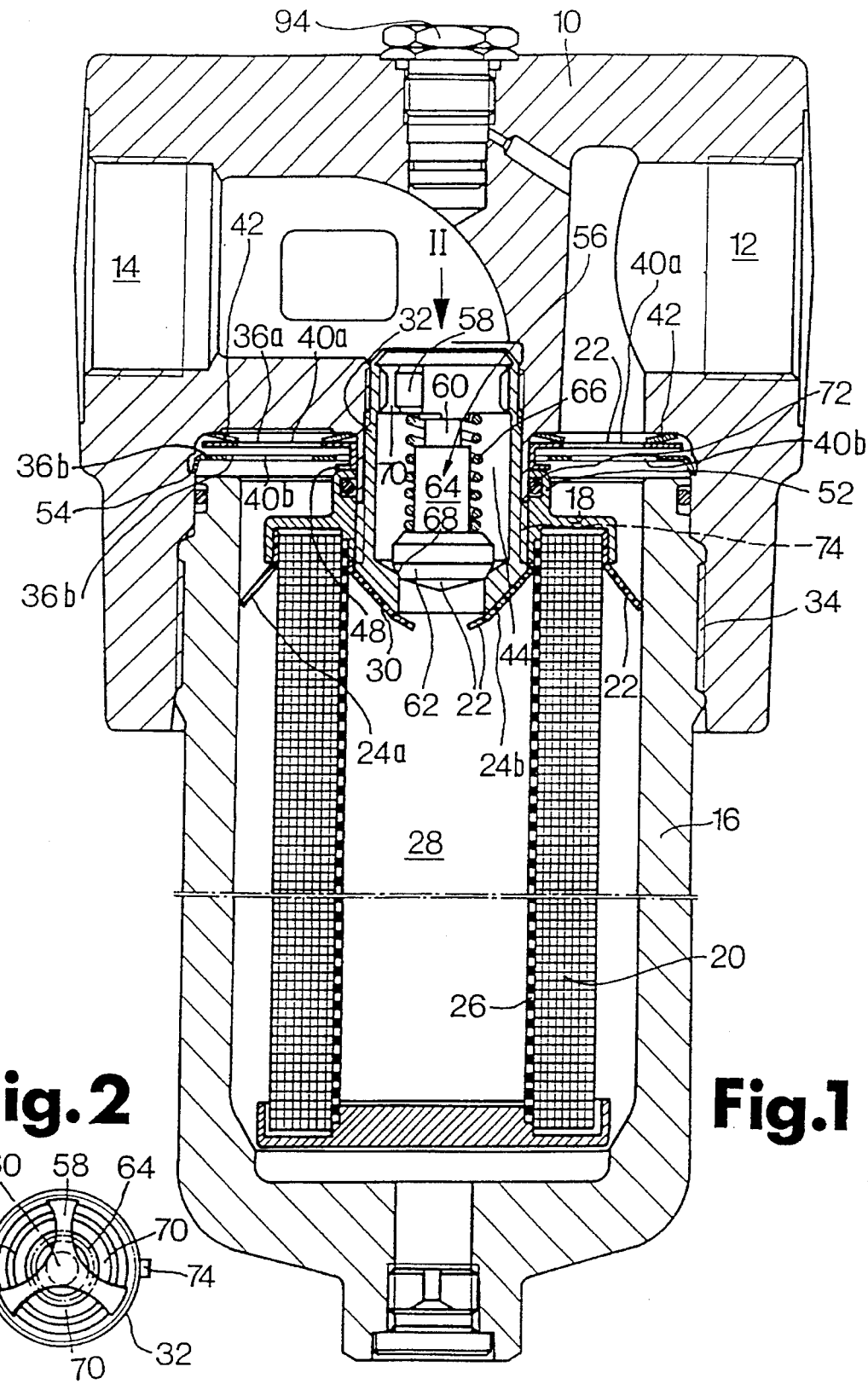

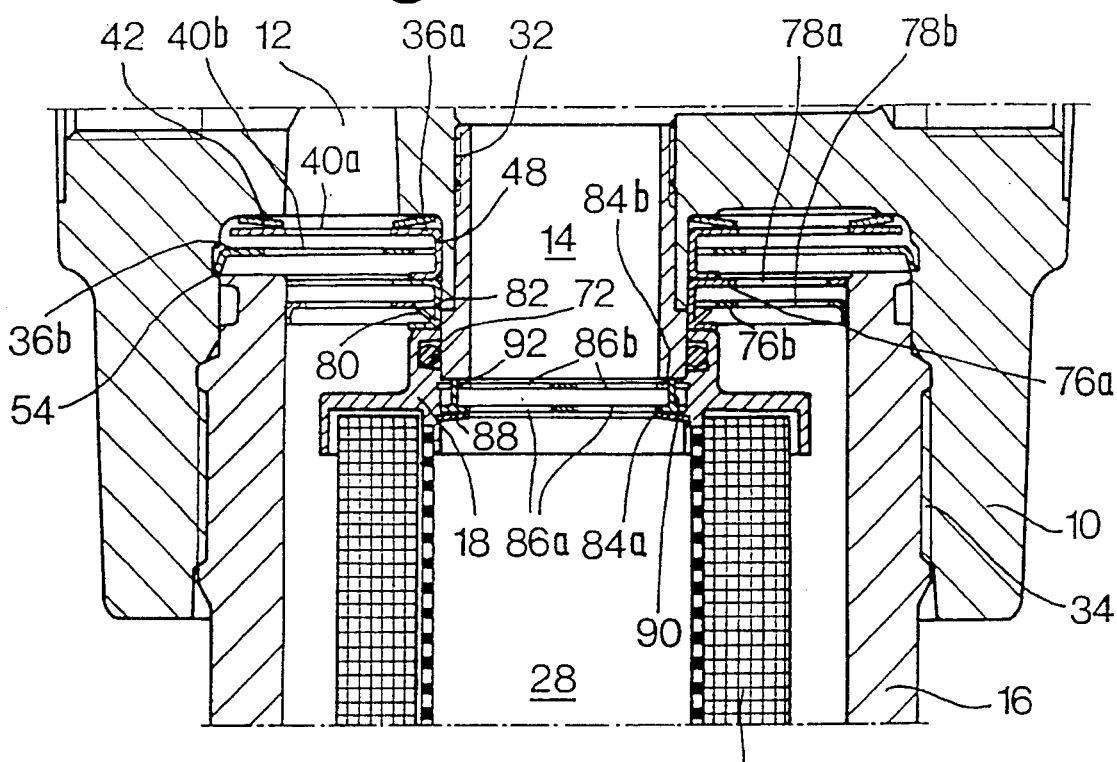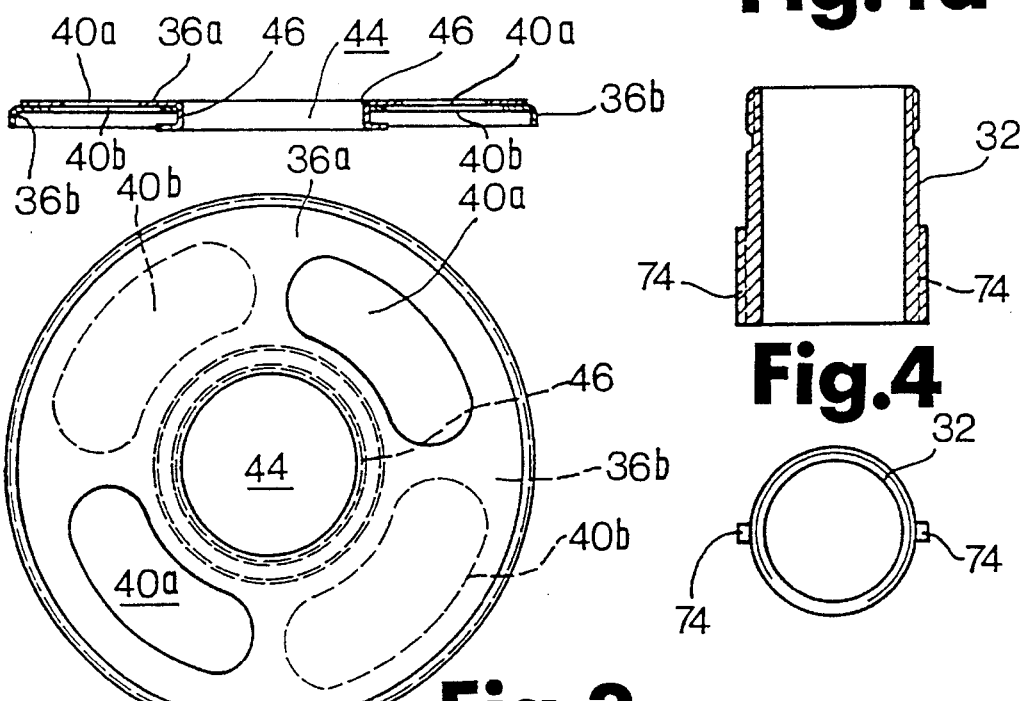

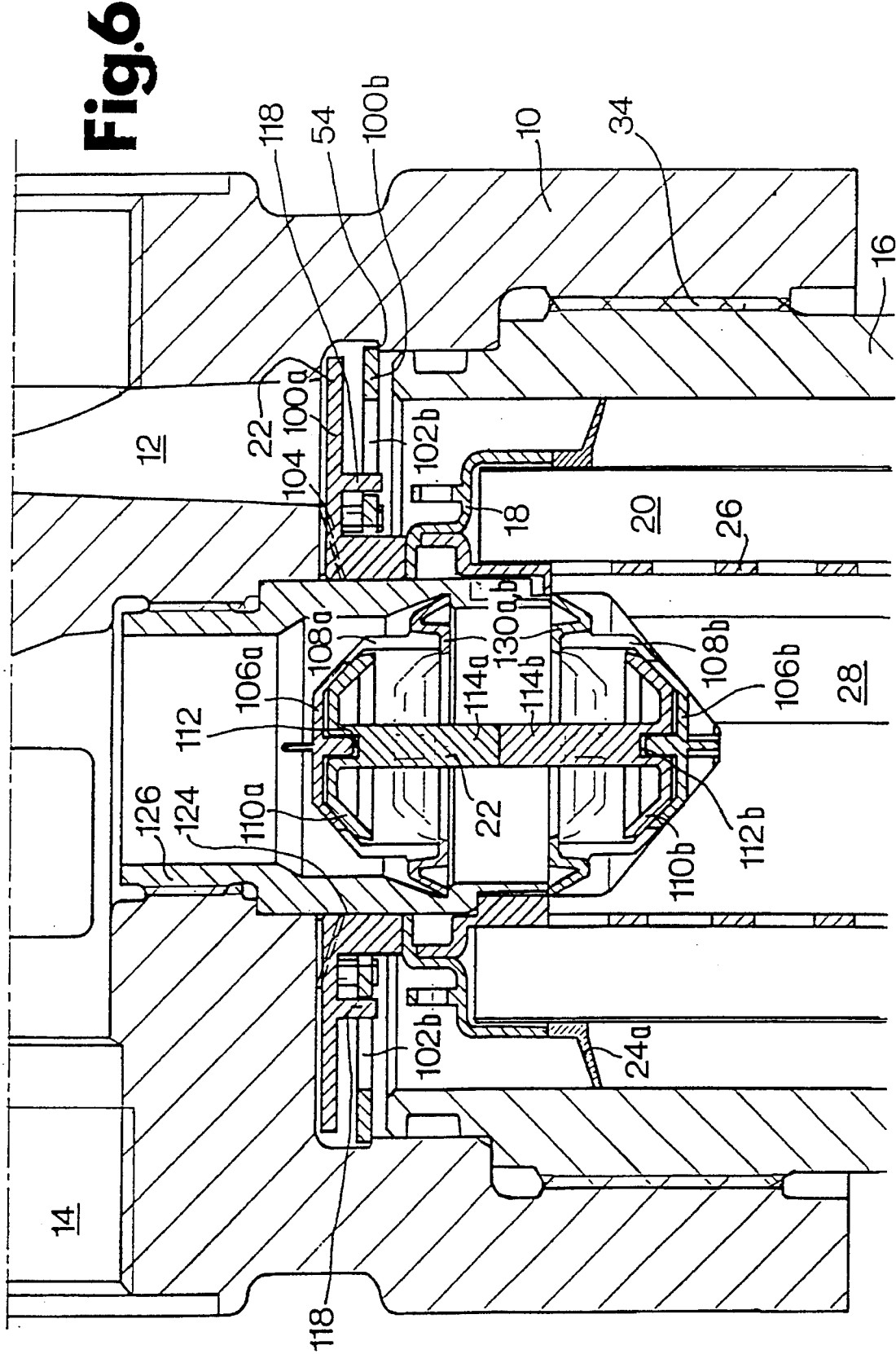

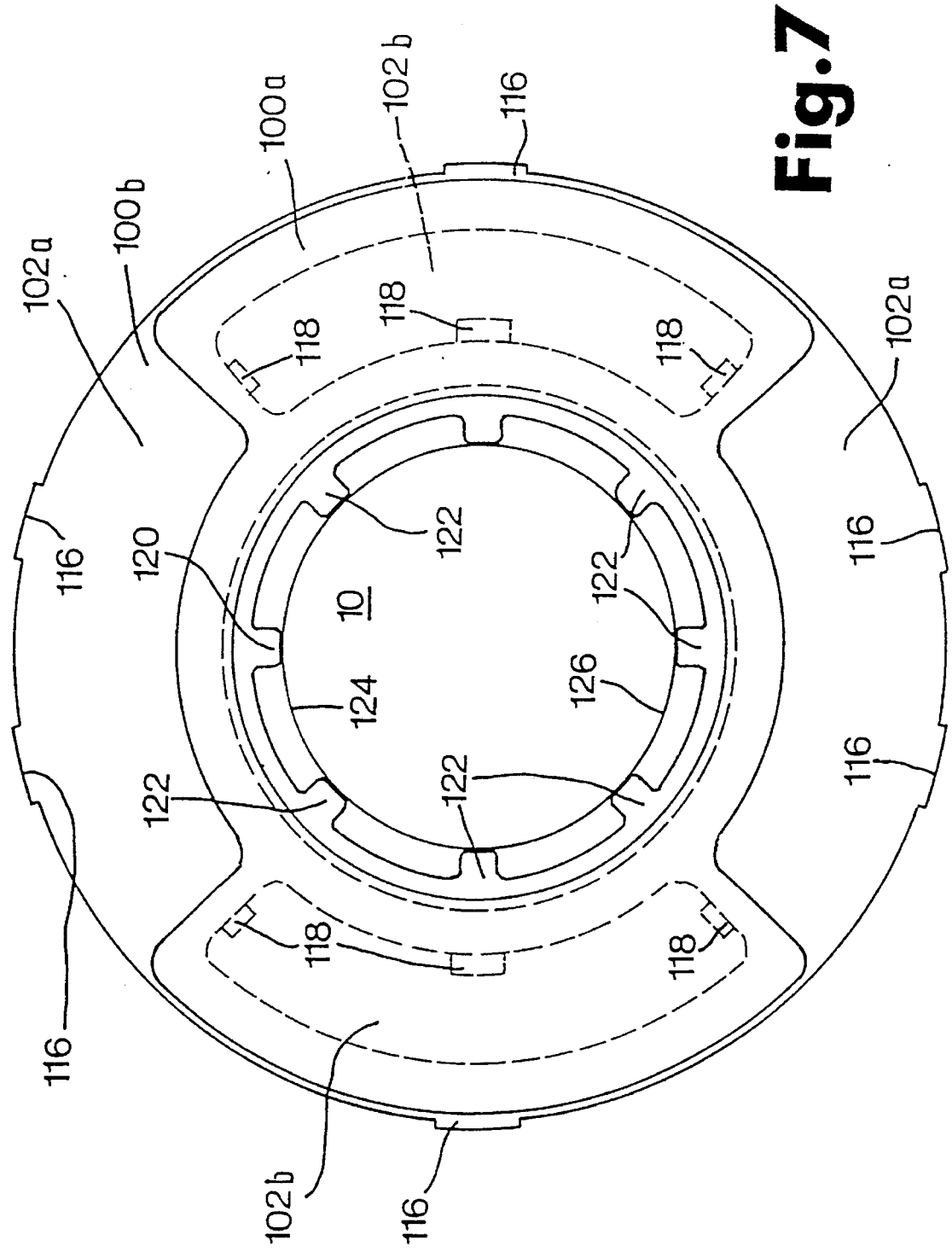

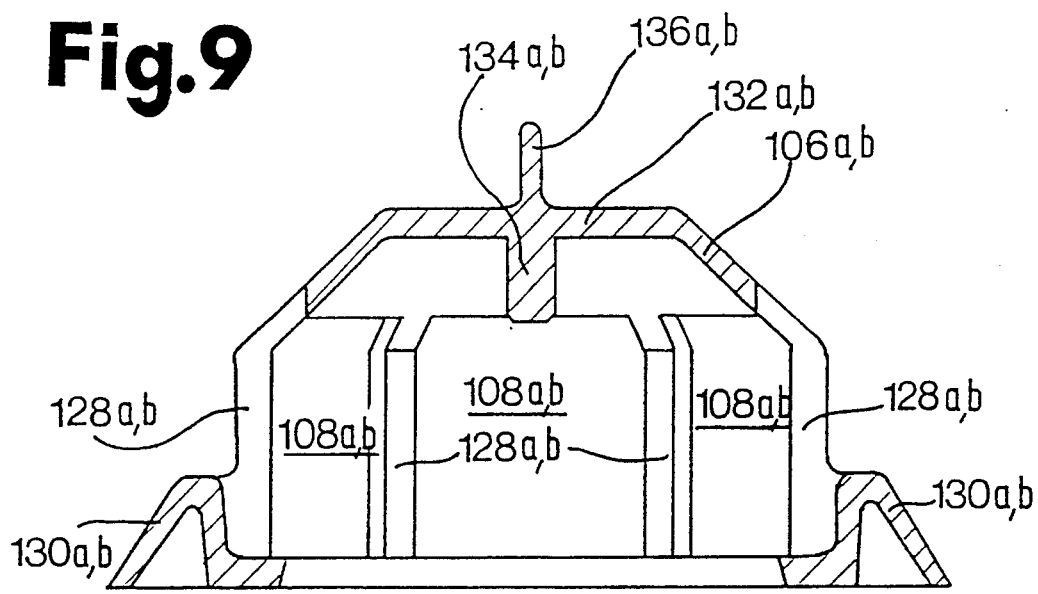
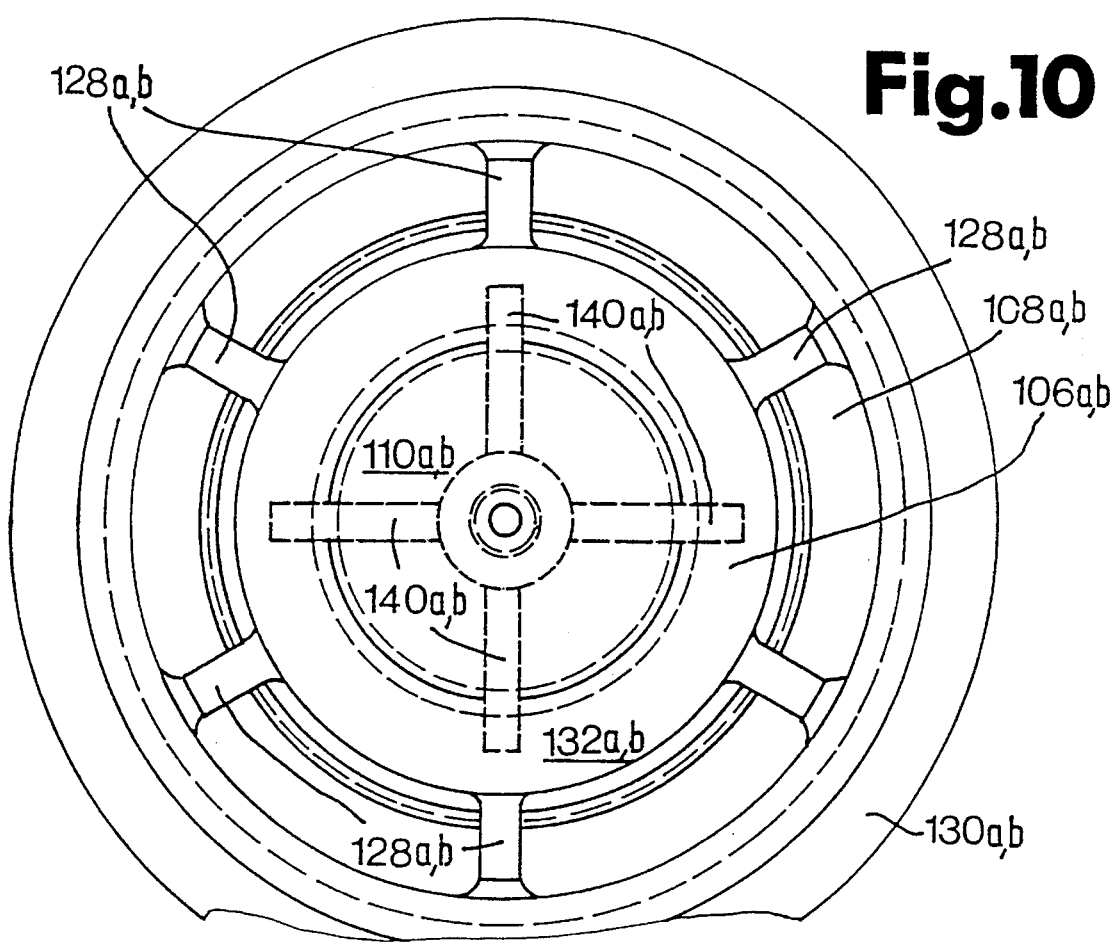

FILTER DEVICE WITH CLOSING ARRANGEMENT AND KEY OPENING CONNECTION

FIELD OF THE INVENTION

The present invention relates to a filter device with a housing having connections for fluid flow. The housing can be connected with a filter pot having at least one filter element held tightly by an element holder. A closing arrangement prevents any undesired fluid leakage upon removal of the filter pot from the housing.

BACKGROUND OF THE INVENTION

In filter devices, contaminated fluid can be guided through a feed line into a filter pot incorporating the filter element, flowing from the outside inward through the filter element. In this manner, the polluting material particles are separated from the fluid. Cleaned in this manner, the fluid proceeds from the inside chamber of the filter element and through the associated drain from the filter housing to the use point in the hydraulic or other fluid circuit which is being supplied with clean fluid.

After an extended period of time in use, such filter element becomes contaminated, and must be replaced with a new, clean filter element. For this purpose, the filter pot with the filter element arranged therein is screwed or threaded out of the housing and then removed according to conventional practice. During this unscrewing step, the element holder is usually moved radially along with the filter element. The packing or sealing ring provided between element holder and housing can be damaged in the process. Especially in the reverse situation, following exchange of the filter element and replacement of the filter pot in the housing by screwing in and out, crushing, drilling and sliding movements may occur in the packing ring. Such movements tend to negatively influence the sealing effect of the packing ring, so that unfiltered fluid can become mixed with already filtered fluid.

During the exchange process the filter pot is filled with fluid, such as hydraulic oil, liquids which are flame-resistant, biologically decomposable liquids or polluted water. Frequently fluid leaks out inadvertently into the environment and leads to pollution of the environment. Such pollution occurs most often when the exchanging filter elements in working machinery located outside.

The filter devices disclosed in German Patent No. 30 31 431 C2 and German unexamined publication 26 23 409 have closing arrangements constructed as reflux check valves of elastomeric material. A valve in the form of a one-part flange member surrounds the element holder for the filter element. As soon as fluid is fed in through one of the connections, in the form of a feed line, the elastically flexible flange-like valve opens. Otherwise, the valve is held in its closed position because of its elasticity, and prevents undesired fluid discharge into the atmosphere through the connection or when the filter pot is removed out of this assembly. No closing of the fluid-carrying connections in the housing of the device is provided. The known closing devices require considerable structure space in the area of the element holder and do not always function reliably during operation. Especially with the pressure peaks in the connections or even in the case of an undesired reversal of the fluid flow direction, an inversion or tearing apart of the plate- or disk-like elastomeric sealing border of the flange part can cause the closing arrangement to become unserviceable. This last occurrence leads to breakdown of the filter device.

SUMMARY OF THE INVENTION

Objects of the present invention are to provide a filter device having a universally adjustable closing arrangement which can be produced at reasonable cost, requires only limited construction area and functions reliably during operation.

The foregoing objects are basically obtained by a filter device comprising a housing having first and second fluid connections, a filter pot and closing means in the housing to prevent undesired fluid leakage. The filter pot has an open end reasonably coupled to the housing, has a filter element with an inside chamber and has a filter holder secured to the filter element. The closing means has relatively movable first and second closing plates partially defining and limiting first and second openings in the closing plates, respectively. The first and second openings are relatively offset in two different planes. Separate power means relatively moves the closing plates to close continuously and progressively the openings to seal one of the first fluid connection, the second fluid connection and the open end of the filter pot upon increasing separation of the filter pot from the housing.

The closing arrangement requires only a small structural space within the device. The path of movement of the essentially flat closing plates from the open position into closed position, and vice versa, is thus limited and reliable. Disturbance-free operation is attained because of the linear, uniform movement of the closing plates. With this closing arrangement, both connections in the housing and additionally or alternatively the filter pot can be shut off relative to the environment and be hermetically sealed to prevent undesired fluid leakage, because the filter device according to the present invention is universally adjustable. With the closing arrangement of the present invention, a plate valve is realized which closes with extremely operationally reliability and with a seal and works accessible in any possible operational state.

In the normal cycle, the closed filter pot can be sent back to the manufacturer with the polluted filter element as it is removed. The manufacturer then undertakes suitable waste disposable and reuses reusable parts, for instance, the filter pot. Following suitable cleaning, the reusable parts can be used for new devices or as replacement parts.

In one preferred embodiment of the filter device according to the present invention, the closing arrangement has a nonreturn valve inserted in the drain. The valve opens during the filtering process and is closed upon removal of the filter pot. For this purpose, and in the case of a possible reverse flow of fluid out of the drain in the direction of the filter element, a hermetic seal is guaranteed.

In another preferred embodiment of the filter device according to the present invention, the closing arrangement has two reinforcement parts with openings arranged one behind the other in the direction of flow of the fluid. Each reinforcement part incorporates a separate closing part. Each closing part is held by means of the other closing part, counter to the force of a power storage device, in its particular setting for freeing the openings in the reinforcement parts. Upon removal of the filter pot, one closing part closes off the connection serving the housing drain. The other closing part closes the inside of the filter element from its surrounding environment with a seal. A constraint coupling is advantageously provided between two closing parts, by which synchronous opening and closing of the housing connection and of the connection with the element holder is made possible. Since the openings of the reinforcement parts are arranged one after the other in the fluid flow direction, any flow resistance effecting the fluid is avoided.

One especially preferred embodiment of the filter device of the present invention provides a form-locking connection between the filter element holder and parts of the housing by means of a torsion-security arrangement. In an exchange process of the filter pot with the filter element, the element holder is thrust axially only in the same direction as the twisting or screwing. With no time loss on the part of the operator, the closing plates with their openings assume precise and proper adjustment of their structural position, arranged offset from one another, in order to finally undertake reliable operation from their offset structural position.

Other objects, advantages and salient features of the present invention will become apparent from the following detailed description, which, taken in conjunction with the annexes drawings, discloses preferred embodiments of the present invention.

BRIEF DESCRIPTION OF THE DRAWINGS

Referring to the drawings which form a part of this disclosure:

FIG. 1 is a side elevational view in section of a filter device according to a first embodiment of the present invention;

FIG. 2 is a top plan view of a closing arrangement in the direction of arrow II of FIG. 1;

FIG. 3 is a top plan view of a closing arrangement in the form of a plate valve;

FIG. 3a is a side elevational view in section of the plate valve of FIG. 3;

FIG. 4 is a top plan view of a torsion-security arrangement for the filter element;

FIG. 4a is a side elevational view in section of the security-torsion arrangement of FIG. 4;

FIG. 5 is a partial side elevational view in section of the top part of a filter device according to a second embodiment of the present invention;

FIG. 6 is a partial, side elevational view in section of the top part of a filter device according to a third embodiment of the present invention;

FIG. 7 is a top plan view of another embodiment of a plate valve according to the present invention;

FIG. 9 is a side elevational view in section of a reinforcement part provided for the closing part of FIGS. 8 and 8a; and FIG. 10 is a top plan view of a closing arrangement comprising the closing part and the reinforcement part of FIGS. 8, 8a and 9.

DETAILED DESCRIPTION OF THE INVENTION

Figure 8:
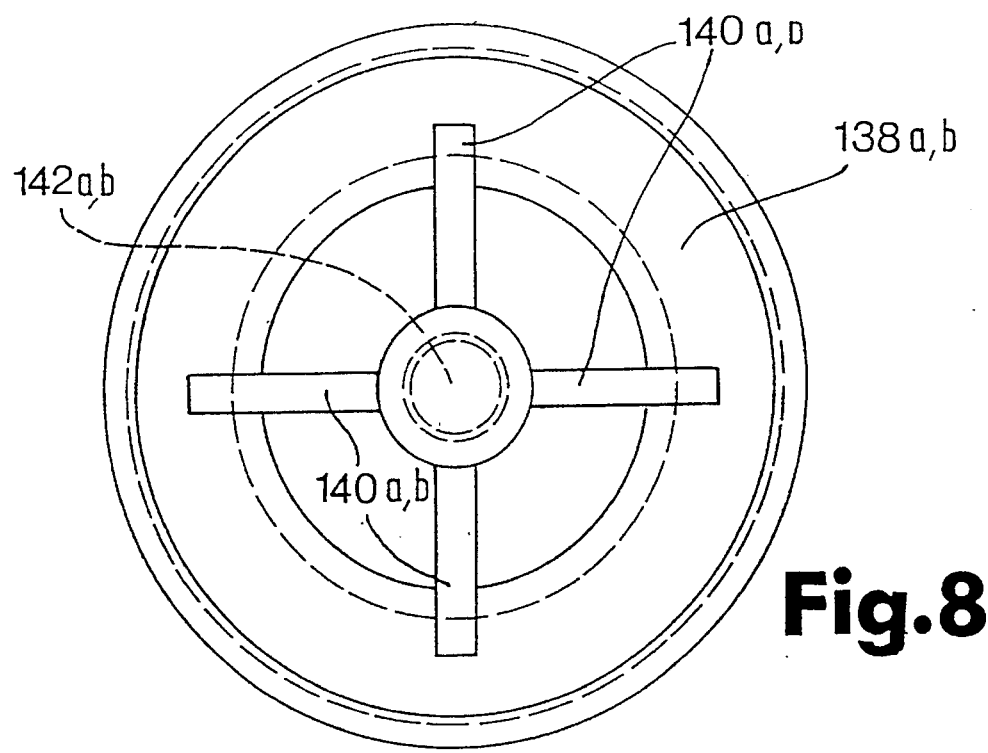
FIG. 8 is a bottom view of a closing part of a closing arrangement of FIG. 7.

The filter device according to the present invention has a housing 10 with a feed line 12 and a drain 14 for conveying a fluid. Housing 10 can be connected with a filter pot 16 having a filter element 20 held securely by an element holder 18. Such filter devices are sufficiently known that the individual parts of the filter device are described only insofar as their description is needed for understanding the present invention.

A closing arrangement, indicated in its entirely in the first embodiment as 22, has two annular sealing flaps 24a and 24b, arranged security between the element holder 18 and the outside periphery and inside periphery of filter element 20, respectively. A supporting lattice 26 is also between the filter element inside periphery and element holder 18. Outside sealing flap ring 24a is shown in FIG. 1 in a closed setting. The closing arrangement is opened as soon as a fluid pressure appears in feed line 12. When sealing flap 24a is opened, unfiltered fluid passes through the outside periphery of filter element 20, as well as through the perforated supporting lattice, into the inside chamber 28 of filter element 20. Pollutants which may be present remain in filter element 20. The fluid in inside chamber 28 is cleaned.

Interior sealing flap or ring 24b is supported on a tapered sleeve 30 of a torsion-security arrangement 32. If filter pot 16 is separated from housing 10 by unscrewing thread 34, and if fluid feed or flow through feed line 12 is terminated, the elastically flexible sealing flaps 24a and 24b, because of their inherent tension or bias, especially if they are of rubber, are engaged again on the inside periphery of filter pot 16 and are in contact with each other in the middle of the filter pot. Consequently, a hermetical seal closes inside chamber 28 of filter pot 16, which is at least partially filled with contaminated fluid, from the surrounding environment. The closing procedure of sealing flaps 24a and 24b progresses continually. Closing arrangement 22 automatically closes the possible flow through points. When a new filter element 20 is inserted and filter pot 16 is screwed into housing 10 by means of thread 34, inside sealing flap ring 24b is pushed up over tapered sleeve 30 of torsion-security arrangement 32, and sealing flat ring 24a is opened by the fluid feed or flow through feed line 12.

In addition, following removal of filter pot 16, closing arrangement 22 automatically closes the connections with feed line 12 and a drain 14. For this, closing arrangement 22 has two closing plates 36a and 36b in the form of two plates or disks which have openings 40a and 40b (FIG. 3), respectively, arranged offset from one another in two different planes. The plates or disks can be moved back and forth relative to one another under the effect of the bias of an annual disk spring element 42, during removal of filter pot 16 for closing openings 40a and 40b. Consequently, a sort of plate valve is used, as shown in greater detail in FIGS. 3 and 3a. FIG. 3 shows top plate or disk 36b turned toward the viewer with the two diametrically opposite openings 40a. Plate or disk 36b is positioned thereunder in a second plane further away from the viewer and covered by plate or disk 36a. Openings 40b are offset 90 degrees from openings 40a. In the middle of the two plates or disks 36a and 36b, a circular cutout 44 receives and surrounds the sleeve-like torsion-security arrangement 32.

As shown especially in FIGS. 1 and 3a, the upper plate or disk 36a moves along the guide formed by the inside border of lower plate or disk 36b, and has a boundary on the border side and facing toward cutout 44. In the embodiment of FIG. 1, the boundary is formed of a U-shaped angle profile 48 forming bearing surfaces. As shown in FIG. 1, upper plate or disk 36a is supported with its top on disk spring 42. Spring 42 is configured such that, under no circumstances, does it cover openings 40a. Disk spring 42 is supported in housing 10. Under the spring bias, plate or disk 36a has its angle profile 48 pressed against a projecting bracket 52 integral with annular element holder 18, and consequently, is held in its position.

The other securely arranged plate or disk 36b is offset downward on its outer end remove from cutout 44 (FIG. 1) and is supported with its free end at the point of the offset along a ledge 54 within housing 10. If the previously described filter element exchange is carried out again, filter pot 16 is not removed until disk spring 42 presses movable plate or disk 36a against stationary plate or disk 36b, and thus, hermetically seals openings 41a and 41b. The fluid pressures in feed line 12 work in the direction of the force of the bias of disk spring 42, and thus, reinforce a hermetically sealed closing of closing arrangement 22 in the form of the plate valve with its two plates 36a and 36b.

Closing arrangement 22 has a nonreturn valve 56 inserted in the line for drain 14, which valve opens during the filtering process and closes with removal of filter pot 16. Nonreturn valve 56 is supported on a triple-arm plate 58, shown in detail in FIG. 2 and is securely connected with housing 10. A longitudinal journal 60 is arranged at the connection point of the three arms of tripe-arm plate 58. A valve member 62, which extends into a point, has a sleeve-like longitudinal extension 64 guide over journal 60. If no fluid pressure arises in inside chamber 28, valve member 62 is pressed by a closing spring 66 to engage its conical closing surface against a valve seat 68. Valve seat 68 is part of arrangement 32 to prevent torsion.

When fluid pressure in inside chamber 28 increases above a predetermined threshold value, nonreturn valve 56 opens and fluid flows through inside chamber 28, through torsion-security arrangement 32 and the three opening points 70 between the arms of the triple-arm plate 58 into drain 14. Closing arrangement 22 closes as soon as the pressure in inside chamber 28 of filter pot 16 drops below the predetermined threshold value. This can occur, among other times, during removal of filter pot 16 and consequently during closing of plate valve 36a and 36b. Furthermore, nonreturn valve 56 closes when the interior pressure in drain 14, for example because of unpredicted pressure points in the hydraulic circuit, becomes greater than the pressure produced by the fluid pressure in feed line 12 in inside chamber 28. Consequently, pressure peaks can be picked up to conserve or protect the filter element 20.

As shown in FIG. 1, an O-ring 72 is located in a groove within bracket 52 facing the torsion-security arrangement 32. O-ring 72 is in contact with parts of housing 10, and consequently closes off and seals feed line 12 from the inside chamber 28 of filter pot 16. If O-ring 72 is defective or is not set precisely in position, disturbances arise in the filter device, which disturbances negatively influence the filtering capacity. The origin of these disturbances is difficult for the repair expert to find. To force O-ring 72 as nearly as possible and as uniformly as possible into its predetermined setting, element holder 18 for the intended filter element 20 comes into use as a form-locking connection with parts of housing 10 through arrangement 32 to prevent torsion.

For this purpose, the form-locking connection has one or two cutouts arranged opposite one another on element holder 18, in which engage the two shoulders 74 associated with torsion-security arrangement 32. As shown especially in FIG. 4a, the one or two shoulders 74 arranged opposite one another are configured as longitudinal guides. Element holder 18 is axially guided by shoulders 74 against radial twisting of filter pot 16. This guiding also precludes any tilting, canting or oblique offsetting of filter element 20.

Furthermore, such form-locking connection is required to avoid thrusting plates or disks 36a and 36b against another when the screwing and unscrewing filter pot 16. Thrusting the plates together could lead to operational breakdown of the filter device. A key-port-connection-technology is realized with the form-locking connection over a groove-journal-assembly. This arrangement guarantees that operators of the filter device cannot use filter elements of other manufacture. Traditionally, filter elements can easily be obtained commercially together with the element holder, but without any inside guide arrangement. Such known filter elements, rotated together with the filter pot during its screwing in and screwing out, would allow the plate valve to become useless.

For simplicity, the following embodiments are to be described only insofar as they differ significantly from the previous descriptions. Nearly identical reference numbers are used for comparable parts. The descriptions of the new embodiments likewise correspond to the original.

For hermetic sealing of filter pot 16, in the FIG. 5 embodiment of the filter device, plate valves are used as described for the first embodiment of FIG. 1. Plate valve plates 36a and 36b with openings 40a and 40b and disk spring 42 are shown for closing feed line 12 in FIG. 5. In the direction of flow behind this first plate valve a second plate valve is arranged. The second plate valve comprises corresponding identical plates or disks 76a and 76b with openings 78a and 78b arranged in two different planes offset from one another. In this case, however, the bottom stationary plate or disk 76b is supported on a spring element 80. Spring element 80 is held in angle profile 82 of the second plate valve corresponding to angle profile 48. Plate valves 36a–36b and 76a–76b are controlled by filter element 20 and are closed by means of the power storage member 42 when filter element 20 is unscrewed with filter pot 16. This reinforces the pressure of spring element 80 thrust against stationary plate or disk 76b. Movable plate or disk 76a, over the angle profile 82, forms the detents in closed setting.

In further development of the invention and in a kinematic reversal, the other plates or disks of the plate arrangements could also be designed as movable and the formerly movable plates or disks could be designed as stationary. Furthermore, combinations are also possible in which both plates or disks of a plate valve could be movable relative to one another, with the assistance of a suitable power source, preferably in the form of disk springs.

In the area of drain 14, the sleeve-like torsion-security arrangement 32, corresponding to FIGS. 4 and 4a, is used. A third plate valve is inserted on the inside periphery of element holder 18, and has plates or disks 84a and 84b with corresponding openings 86a and 86b and a disk spring 88. Plate or disk 84b, arranged on the top in FIG. 5, is inserted in the edge of element holder 18, as is disk spring 88. Second plate or disk 84a with openings 86a is arranged between plate 84b and disk spring 88, and is longitudinally movable under the influence of disk spring 88. This second plate or disk 84a has an annularly projecting longitudinal guide 90 at its disposal. Longitudinal guide 90 engages an annular cutout 92 in the outer plate or disk 84b. Projecting longitudinal guide 90 is braced on the bottom of sleeve-like torsion-security arrangement 32 and is consequently held at some distance from the first plate or disk 84b.

With removal of filter pot 16, the third plate valve is automatically closed under the influence of disk spring 88. Bottom valve plate or disk 84a is moved against top plate or disk 84b, whereby the second and third plate valves are closed and removed with filter pot 16. The first closed plate valve remains in housing 10. In this embodiment, the middle part of the plate valve is closed, and consequently, has no opening comparable to cutout 44.

Nonreturn valve 56 of FIG. 1 is not present in this second embodiment shown in FIG. 5. However, if pressure peaks in drain 14 should make necessary the use of a nonreturn valve, such a valve can be incorporated inside torsion-security arrangement 32.

Another or third embodiment of the filter device is shown in FIGS. 6–10. For closing inlet 12, a plate valve is provided with two closing plates 100a and 100b. Closing plate 100b, shown in FIG. 6 at the bottom, is stationary and is supported along its outside periphery on ledge 54 in housing 10. Top closing plate 100b is movably supported under the bias of a disk spring 104 against bottom closing plate 100b.

The precise construction of this plate valve is illustrated in the top plan view of FIG. 7. Top closing plate 100a is configured butterfly-like, with its two wings defining the two openings 102a lying in the same plane with this plate. The openings are limited at the bottom by the circular plate or disk 100b and are enclosed at the front by housing parts 10. Plate or disk 100b has flange-like tabs 116 projecting radially outward and distributed around its outside periphery for support of bottom closing plate 100b on ledge 54 in housing 10. The two wings of top closing plate 100a completely cover the two diametrically opposite openings 102b of bottom closing plate 100b.

Closing plate 100a has individual downward-projecting flanges 118 on its bottom to form a longitudinal guide for the closing plate. Flanges 118 engage or are received in openings 102b associated with them in each stage of the procedure incorporating plate 100a, and are propped on or engage the inside edges of the respective cutout 102b. Along its inside periphery, top plate 100a is guided over a guide ring 120 with radially inwardly projecting guide lugs 122 extending along a cylindrical guide surface 124. Guide surface 124 is part of a housing insert 126 screwed into drain 14. This insert, for simplicity, is shown in FIG. 7 only, by its outside edge, and can also be configured identical to the torsion-security arrangement 32 shown in FIGS. 4 and 4a. Upon removal of element holder 18 and filter element 20, top closing plate 100a is moved under the effect of the valve spring 104 into a closed position, closing off openings 102b. Openings 102a are closed synchronously by bottom closing plate 100b. When the plate valve is open, the fluid found inside filter pot 16 flows through feed line 12, top opening 102a and the diametrically opposite opening 102b.

Drain 14 in the filter embodiment shown in FIG. 6 is closed by a closing arrangement 22. This closing arrangement has two opposite, inversely arranged, but identically configured, reinforcement parts 106a and 106b with openings 108a and 108b. The openings are arranged one behind the other in the direction of flow of the fluid from the inside chamber 28 of filter element 20 to drain 14. Each reinforcement part 106a and 106b is associated with a closing part 110a and 110b, respectively. Each closing part is held by means of the other closing part, counter to the force of a power source 112a and 112b, in its position freeing openings 108a and 108b (FIG. 6). Upon removal of filter pot 16, one closing part 110a closes off the connection serving as drain 14, and the other closing part 110b closes off the inside chamber 28 of filter element 20 from the surrounding environment forming a fluid seal. The closed setting of closing parts 110a and 110b is shown in broken lines in FIG. 6.

As shown especially in FIG. 9, each reinforcement part 106a or b is configured to be hood-like and surrounds openings 108a or 108b by means of downwardly bent flanges 128a or 128b. The reinforcement part 106a or b has a bracket-like annular surface 130a or b, supported with its free outside edge on an inwardly projecting flange of the housing insert 126, as shown in FIG. 6. Annular surface 130a or b is connected through flange 128a or b with hood 132a or b of the assembly, which on its inside, facing annular surface 130a or b, has a cylindrical guide journal 134a or b. On the side of that assembly hood 132a or b, facing away from guide journal 134a or b, is a handle 136a or b. The shape of handle 136a or b is obtained by spray molding, insofar as a plastic material is used in spray molding the reinforcement part 106a or b.

Figure 8A:
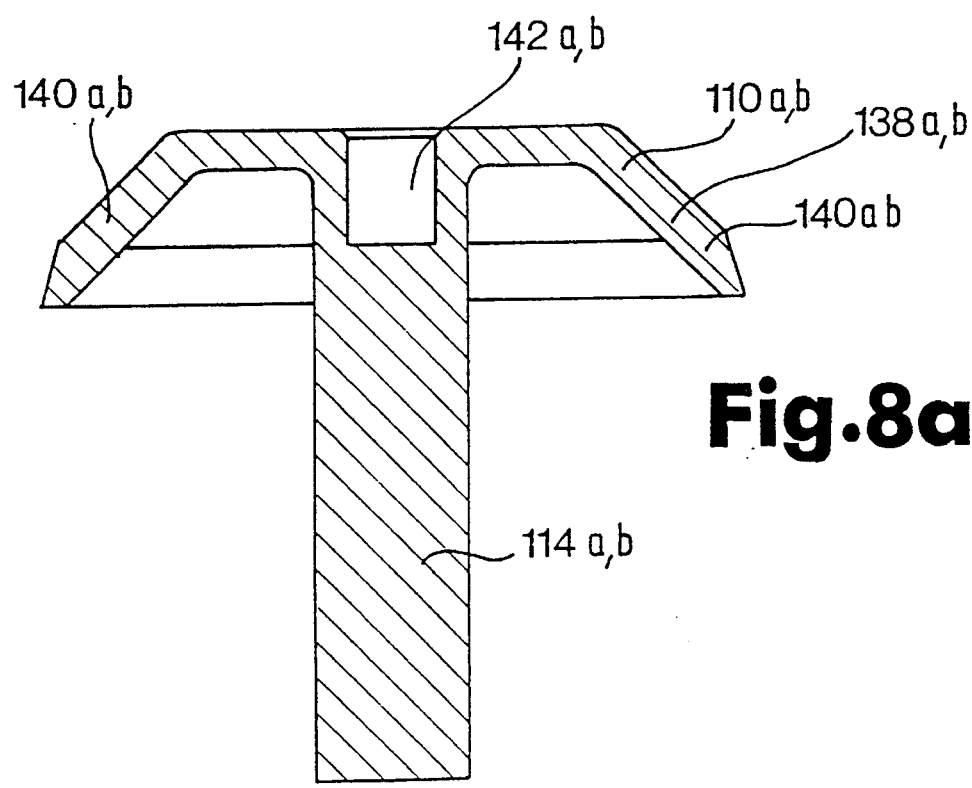
FIG. 8a is a side elevational view in section of the closing part of FIG. 8.

Reinforcement part 106a or b movably holds a screen-like closing part 110a or b, illustrated in greater detail in FIGS. 8 and 8a. As shown particularly in FIG. 8a, the closing part is spray-injected, preferably of a plastic material, is configured to be screen-like, and has a journal-like extension 114a or b inserted in reinforcement part 106a or b. The journal-like extension projects out from the reinforcement part. The screen 138a or b is supported on four supporting flanges 140a or b arranged radially relative to journal-like extension 114a or b. Extension 114a or b has a cylindrical cutout 142a or b on its top. The guide journal 134a or b of the reinforcement part 106a or b can be engaged in cutout 142a or b. Between guide journal 134a or b and cylindrical cutout 142a or b a pressure spring (not shown) is inserted. The pressure spring has a great range of movement, and when compressed requires a particularly small structural space. The plan view shown in FIG. 10, showing the open state of the distributor arrangement, illustrates reinforcement part 106a or b surrounding closing part 110a or b with opening of openings 108a or 108b, and serving as a guide for closing part 110a or b.

When filter pot 16 is unscrewed from housing 10, the engagement of the extensions 114a and 114b of closing parts 110a and 110b is retained. Consequently, each screen 138a and b is moved continuously and progressively into its position shown in FIG. 6 in broken lines, before the two extensions 114a and 114b are released from engagement with one another. If closing parts 110a and b are in their closed position, the bottom borders of screens 138a and b lie on the inwardly inclined edges of annular surfaces 130a and b of support parts 106a and b. Openings 108a and 108b are hermetically sealed in this closed position. Following exchange of filter element 20, if filter pot 16 is brought back into its connected arrangement in housing 10 as in the representation shown in FIG. 6, this controlled process occurs in the opposite manner. Extensions 114a and 114b of closing parts 110a and 110b execute the open setting of the hood valve arranged in the middle and working in both directions.

The filter device according to the invention can have a reversing valve or a bypass valve unit, as conventionally used with these devices, and thus, are not described in detail. Electronically operated connection parts could be used instead of the closing and sealing plug 94. Plug 94, among other results, give over the pressure- and pollution-ratios in the feed line 12, as well as in the drain 14.

While various embodiments have been chosen to illustrate the invention, it will be understood by those skilled in the art that various changes and modifications can be made therein without departing from the scope of the invention as defined in the appended claims.

We claim:

1. A filter device, comprising:

a housing having first and second fluid connections;

a filter pot having an open end releasably coupled to said housing, having a filter element with an inside chamber and having a filter element holder secured to said filter element; and a closing arrangement including closing means, connected to at least one of said housing and said filter pot, for preventing undesired fluid leakage during assembly and disassembly of the filter device, said closing means having relatively movable first and second closing plates partially defining and limiting first and second openings in said closing plates, respectively, said first and second closing plates being located directly adjacent each other in two different, substantially parallel planes, said first and second openings being relatively offset in said two different parallel planes, biasing means coupled to said closing plates for relatively moving said closing plates in a linear direction perpendicular to said two different parallel planes to close continuously and progressively said openings to seal at least one of said first fluid connection, said second fluid connection and said open end of said filter pot upon increasing separation of said filter pot from said housing.

2. A filter device according to claim 1 wherein said first closing plate is stationary relative to one of said housing and said filter pot; and said second closing plate is movable and responsive to forces of said biasing means.

3. A filter device according to claim 1 wherein said closing plates comprise guide means on borders thereof for guiding relative movement therebetween.

4. A filter device according to claim 1 wherein said first connection is a drain; and said closing arrangement further comprises a nonreturn valve coupled to said drain, said nonreturn valve opening during filter operation and automatically closing upon removal of said filter pot from said housing.

5. A filter device according to claim 4 wherein said nonreturn valve is mounted on a support plate having a plurality of radially extending arms, said arms engaging said housing and defining fluid flow passageways therebetween.

6. A filter device according to claim 1 where said first connection is a drain;

said closing arrangement further comprises first and second reinforcement parts with first and second openings therein, respectively, said first and second reinforced parts being arranged in series in a fluid flow direction through said housing;

first and second closing parts are coupled to said first and second reinforcement parts, respectively, for relative movement between open and closed positions; in said open positions of said closing parts, said first and second openings in said reinforcement parts are open to allow fluid flow therethrough; in said closed position of said first closing part, said first closing part closes and seals said first connection; in said closed position of said second closing part, said second closing part closes and seats said inside chamber of said filter element; and biasing means, coupled to said closing parts, forces said closing parts to said closed positions upon removal of said filter pot from said housing.

7. A filter device according to claim 6 wherein said first and second reinforcement parts are dome-shaped and surround said first and second closing parts, respectively; and each of said closing parts comprises a journal extension projecting beyond the respective reinforcement part, said extensions extending toward and engaging each other to move said closing parts against said biasing means into said open positions from said closed positions thereof.

8. A filter device according to claim 1 wherein said closing arrangement further comprises at least one elastically, flexible seal means extending between said filter element holder and said filter pot.

9. A filter device according to claim 8 wherein said seal means comprise sealing flaps.

10. A filter device according to claim 1 wherein said filter element holder is coupled to said housing by a form-locking connection over a torsion-security arrangement.

11. A filter device according to claim 10 wherein said form-locking connection comprises a mating projection and cutout in said filter element holder and said torsion-security arrangement.

* * * * *